(12) United States Patent
Aamodt et al.

(10) Patent No.: US 7,207,009 B1
(45) Date of Patent: Apr. 17, 2007

(54) METHOD AND SYSTEM FOR DISPLAYING AN IMAGE INSTEAD OF DATA

(75) Inventors: Jeffrey R. Aamodt, Sammamish, WA (US); David E. Levin, Bellevue, WA (US); Darius Snapkauskas, Issaquah, WA (US); Brett A. Bentsen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 489 days.

(21) Appl. No.: 09/704,171

(22) Filed: Nov. 1, 2000

(51) Int. Cl.
*G06F 17/00* (2006.01)
(52) U.S. Cl. ...................... 715/772; 715/839
(58) Field of Classification Search ................ 345/968, 345/780, 835, 839; 707/2; 715/503, 509, 715/968, 780, 835, 839, 772, 504, 505, 506, 715/507, 508, 746, 775; 705/8, 9
See application file for complete search history.

(56) References Cited

U.S. PATENT DOCUMENTS

| | | | | |
|---|---|---|---|---|
| 4,859,187 | A * | 8/1989 | Peterson | 434/118 |
| 5,704,028 | A * | 12/1997 | Schanel et al. | 345/440 |
| 5,918,238 | A * | 6/1999 | Hayashi | 715/526 |
| 6,323,885 | B1 * | 11/2001 | Wiese | 345/835 |
| 6,349,315 | B1 * | 2/2002 | Sonoyama et al. | 715/528 |
| 6,441,836 | B1 * | 8/2002 | Takasu et al. | 345/835 |

OTHER PUBLICATIONS

"Project Gateway 5 Repository User Manual." Revision B. Apr. 1999. Marin Research. [Retreived on Oct. 6, 2004]. Retrieved from the Internet <URL: http://web.archive.org/web/20000523053952/www.marinres.com/tech.html>.*

* cited by examiner

*Primary Examiner*—Tadesse Hailu
*Assistant Examiner*—Blaine Basom
(74) *Attorney, Agent, or Firm*—Perkins Coie LLP

(57) ABSTRACT

Displaying graphical indicators, instead of data, based on user-defined conditions. The user can specify conditions for displaying graphical indicators instead of actual data by specifying a test, values, and an image. The graphical indicators can be pre-assigned images that are dynamically applied based on the underlying text or numeric data values. Graphical indicators allow the user to visually represent data types or categories with graphics, based on the user's conditions. Different conditions can be specified for a given data field and each condition can be associated with a particular graphical indicator. Prioritized processing of data conditions allow for complex control of which indicator will be displayed to visually represent the data. When the underlying data in a field changes, the criteria can be reapplied and the field dynamically updated to the appropriate indicator.

20 Claims, 10 Drawing Sheets

METHOD AND SYSTEM FOR DISPLAYING AN IMAGE INSTEAD OF DATA

TECHNICAL FIELD

The present invention relates to the display of information in a project status report. More specifically, the invention relates to displaying an image in place of data, based on user-defined criteria, to assist the quick visual analysis of data.

BACKGROUND OF THE INVENTION

As computer programs have advanced in the project management field, color-coded project status reporting has been used to provide quick and easy visual identification of data highlighting or categorization. Although this has made information more identifiable, the options have been limited. Color-coded project status reporting has only allowed a user to display pre-defined images. Conventional systems do not allow the user to customize the visual representation of data.

"Stoplight reports" or other color-coded project status reports typically show a green indicator for items on track, a yellow indicator for items at risk, and a red indicator for items in trouble. These color-coded reporting options do not offer the user any control in defining data categories, adding more categories, or displaying different colors or types of images. Prior stoplight reports have not allowed a user to associate indicators with different types of data, such as showing a purple flag for employees whose last name begins with A to G, a yellow bubble for ages between 30 and 65, and a blue smiley face for U.S. citizens.

In view of the foregoing, there is a current need in the art to replace a presentation of numeric and textual data, which takes significant mental analysis to evaluate, with quickly recognizable visual images for identifying status, trends, or groupings. There is also a current need for a customizable ability to visually identify data in a variety of ways.

SUMMARY OF THE INVENTION

The present invention solves the above problems by displaying graphical indicators instead of text or numeric data based on user-defined conditions. By representing data with an image, graphical indicators can provide quick and easy visual identification of data highlighting or categorization chosen by the user. This invention can replace numeric and textual data, which typically requires significant mental analysis to evaluate, with quickly recognizable graphical indicators for identifying status, trends, or groupings. The user can specify conditions for displaying graphical indicators instead of numeric or text data by defining test parameters and replacement images.

The graphical indicators can be images that are pre-assigned (as part of specifying the conditions) and then dynamically applied based on the underlying text or numeric data value. Graphical indicators can allow the user to visually represent data types or categories with graphics, based on the user's conditions. Different conditions can be specified for a given data field and each condition can be associated with a particular graphical indicator. Prioritized processing of data conditions can allow for complex control of which indicator will be displayed to visually represent the data. When the underlying data in a field changes, the criteria can be reapplied and the field dynamically updated to the appropriate indicator.

In one aspect, the present invention can use graphical indicators to visually represent data items, such as project status (e.g., items ahead of, on track, or behind schedule or budget), grouping of tasks or resources, flagging of significant items, etc., in the project management field.

Because a hierarchical arrangement of tasks and resources is often used in the project management field, the invention can allow different criteria and indicators to be specified at a nonsummary level, a summary level, and a project summary level. The lowest level in the task hierarchy is non-summary tasks or subtasks and the lowest level in the resource hierarchy is nonsummary resources. Criteria that applies to the lowest level in the hierarchy is nonsummary criteria. The intermediate levels in the task hierarchy are summary tasks and the intermediate levels in the resource hierarchy are summary resources. Criteria that is applied at all intermediate levels in the hierarchy is summary criteria. The top level in the task hierarchy is the project summary task. Criteria that is applied at the top level in the hierarchy is project summary criteria.

If the user hovers a mouse pointer over an indicator icon, a pop-up dialog box, such as a "ToolTip" can be displayed to show the underlying data value.

The present invention can include a user interface (UI), a graphical indicator engine (engine), and a display. The UI can accept graphical indicator conditions from the user. The UI can also validate the user conditions and convert these into condition structures. The engine can store the condition structures and the associated graphical indicator IDs, and can also match the user conditions with the graphical indicator IDs. The display can determine if a graphical indicator should be displayed, look up the graphical indicator that matches the graphical indicator ID, and paint the graphical indicator on the display screen.

More specifically described, the UI can accept graphical indicator conditions specified by the user. Next, the UI can validate the user conditions to confirm that the data type of the user-entered condition is compatible with the data type of the custom field. The UI can convert the user conditions into condition structures that coordinate information on the user conditions and the graphical indicator IDs. The engine can store the condition structures in a local data storage. The display can accept pre-existing data, determine if a graphical indicator matches the condition for this data, and display either text data or a graphical indicator based on this comparison.

The aforementioned advantages of the invention, as well as additional advantages thereof, are more fully described by the detailed description of exemplary embodiments and the accompanying drawings.

DETAILED DESCRIPTION OF EXEMPLARY EMBODIMENTS

The present invention provides a method and system for displaying graphical indicators, instead of data, based on user-defined conditions. By representing data with an image, graphical indicators provide quick and easy visual identification of whatever data highlighting or categorization the user chooses. This invention takes numeric and textual data, which requires significant mental analysis to evaluate, and replaces the data with quickly recognizable graphical indicators for identifying status, trends, or groupings. The user can specify conditions for displaying graphical indicators instead of actual data by defining test parameters, values, and images.

Figure 1:
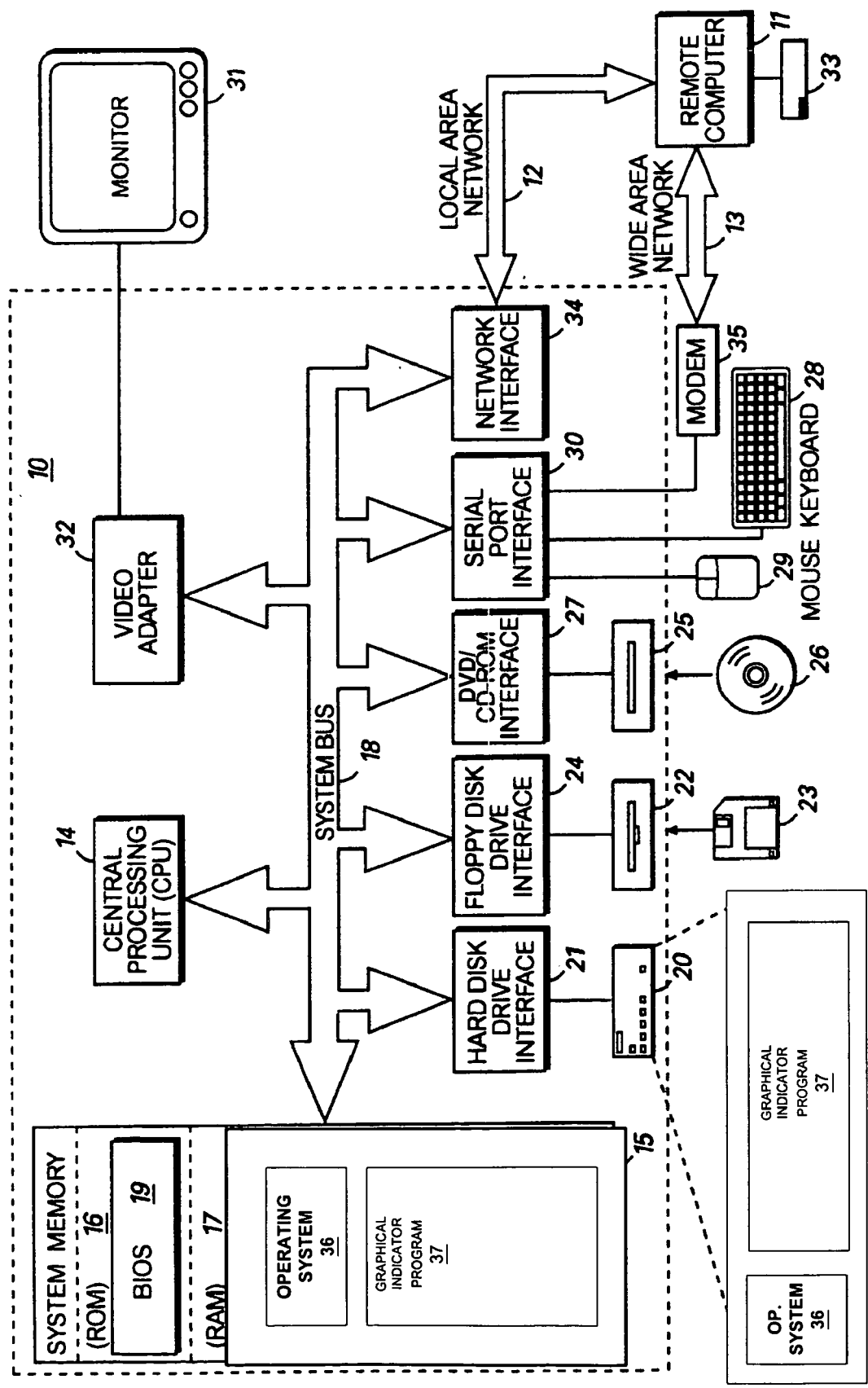
FIG. 1 is a block diagram of a personal computer that provides an operating environment for an exemplary embodiment of the present invention.
Figure 2:
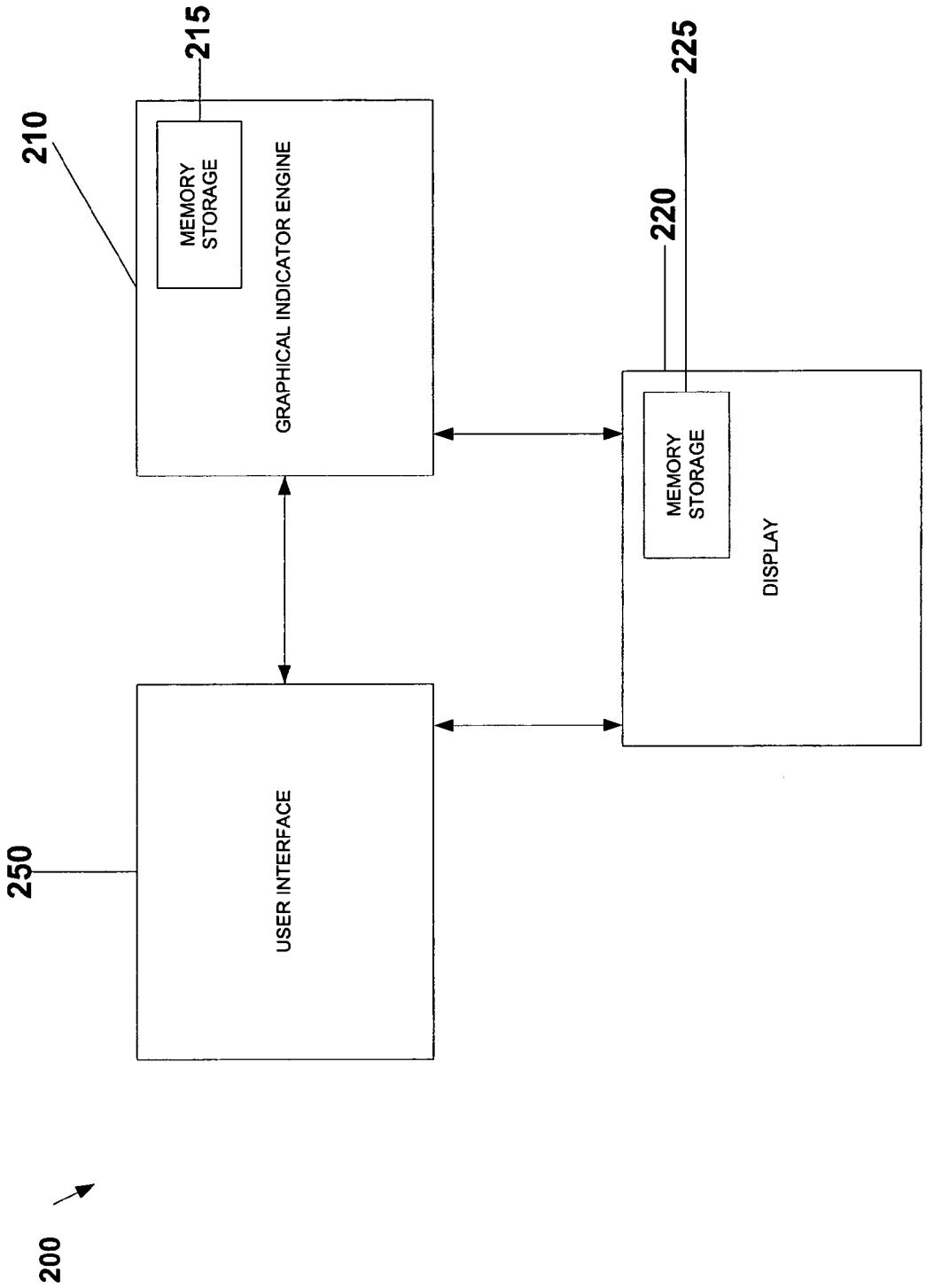
FIG. 2 is a functional block diagram illustrating an exemplary embodiment which can report actions between a UI, a display, and an engine.

FIG. 1 is a block diagram of a personal computer that provides an exemplary operating environment. FIG. 2 is a block diagram illustrating internal objects. FIGS. 3–6 are flow diagrams illustrating exemplary methods for displaying graphical indicators, instead of data, based on user-defined conditions. FIGS. 7–10 are screen displays illustrating an exemplary embodiment of the current invention.

Although an exemplary embodiment will be generally described in the context of a client program module and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

Referring now to the drawings, in which like numerals represent like elements throughout the several figures, aspects of the present invention and an exemplary operating environment will be described.

FIG. 1 illustrates various aspects of an exemplary computing environment in which the present invention is designed to operate. Those skilled in the art will immediately appreciate that FIG. 1 and the associated discussion are intended to provide a brief, general description of an exemplary computer hardware and program modules, and that additional information is readily available in the appropriate programming manuals, user's guides, and similar publications.

FIG. 1 illustrates a conventional personal computer 10 suitable for supporting the operation of an exemplary embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or computer server.

The personal computer 10 includes a central processing unit (CPU) 14. The personal computer also includes system memory 15, including read only memory (ROM) 16 and random access memory (RAM) 17, which is connected to the CPU 14 by a system bus 18. An exemplary computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM or DVD drive 25, which is used to read a CD-ROM or DVD disk 26, is connected to the system bus 18 via a CD-ROM or DVD interface 27. A user enters commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM or DVD drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art will quickly recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that an operating system 36 and one or more program modules, such as a graphical indicator program 37, are provided to the personal computer 10 via computer-readable media. In an exemplary computer, the computer-readable media include the local or remote memory storage devices, which may include the local hard disk drive 20, floppy disk 23, CD-ROM or DVD 26, RAM 17, ROM 16, and the remote memory storage device 33. In an exemplary personal computer 10, the local hard disk drive 20 is used to store data and program modules, including the operating system 36 and a graphical indicator program 37.

The focus of the graphical indicator program 37, which converts data into graphical indicators, is described below in connection with FIGS. 2–10. In an exemplary embodiment, the graphical indicators are used for project management in planning, monitoring, and controlling the development of a particular undertaking. The product management information is usually listed in a grid or spreadsheet comprising rows and columns to display project items and status. In an exemplary embodiment, three task types (nonsummary, summary, project summary) are used for a task field and two resource types (nonsummary, summary) are used for a resource field. The task types are similar to an outline structure, where the project summary is at the top level (by itself), a summary is any interim level, and a nonsummary is a low level task representing a base level. The resource types are also similar to an outline structure, where the summary is at the interim or top level, and the nonsummary is at the base level. A task field is an individual unit of work that is part of the total work needed to accomplish a project. A resource field is personnel, equipment, materials, or a service needed to complete a task in a project.

The graphical indicators can be images that are pre-assigned (as part of specifying the conditions) and then dynamically applied based on the underlying text or numeric data value. Graphical indicators allow the user to visually represent any type of data graphically, based on the user's own conditions. Graphical indicators give the user control in defining data categories, adding more categories (e.g. items ahead of schedule), or displaying different colors or types of images. A user can specify that a particular graphical indicator be displayed in a field of the grid based on whether the corresponding data is an exact value, other than an exact value, within a range of values, or outside a range of values. Different conditions can be specified for a given field and each condition can be associated with a particular graphical indicator. Prioritized processing of these criteria against the data allows for more complex control of which indicator will be displayed. Whenever the underlying data in a field changes, the criteria can be reapplied and the field dynamically updated to the appropriate indicator.

For example, the user can associate images with numbers, dates, phrases, states, or any other categorization of the data, and these images can be tied to either specific values or data ranges (e.g., show a purple flag of employees whose last name begins with "A" to "G", a yellow flag for names beginning with "H" to "Y", and a blue flag just for names that begin with "Z"). The result is a customizable interface that can be used to visually identify data in a variety of ways.

The Internal Objects

Turning now to FIG. 2, exemplary embodiments of the present invention are described. FIG. 2 is a functional block diagram illustrating an exemplary display system 200 comprising a user interface (UI) 250, a display 220, and an engine 210. The UI 250 accepts the user conditions and graphical indicator choices from the user and validates the conditions for the graphical indicators. The UI 250 also converts the user conditions into condition structures and passes the condition structures to the engine 210. The engine 210 includes a memory storage 215 to store the condition structures and the associated graphical indicator IDs. The display 220 determines if an indicator should be displayed in place of data based on a condition assigned to the data field. Once the display 220 determines that a graphical indicator should be displayed, the display 220 asks the engine 210 to compare the data value against the condition structures. The engine 210 compares each graphical indicator condition to the data to find a match and returns the associated graphical indicator ID to the display 220. The display 220 includes a memory storage, such as a cache 225, to look-up the graphical indicator that matches the ID and paints the graphical indicator in the place of the data on the display screen.

The Flow Diagrams

Figure 3:
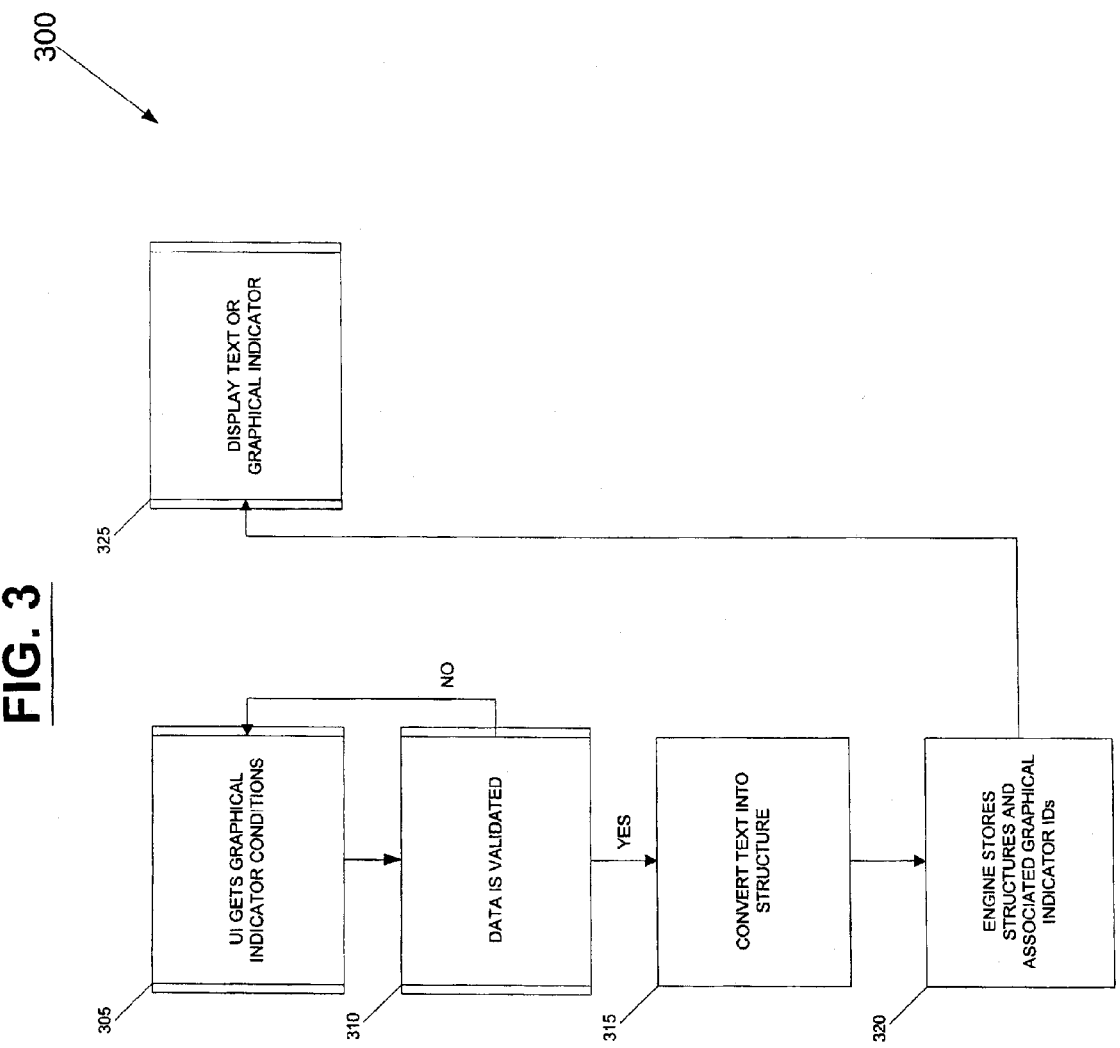
FIG. 3 is a flow diagram illustrating an overview of an exemplary method for displaying a graphical indicator instead of data based on user-defined conditions.

FIG. 3 is flow diagram illustrating the overview of an exemplary method for displaying a graphical indicator instead of data based on user-defined conditions. In step 305, the UI 250 receives graphical indicator conditions and graphical indicator choices from the user. In step 310, the data is validated. In step 315, user-entered text is converted into condition structures. In step 320, the engine 210 stores the condition structures and associated graphical indicator IDs. In step 325, the display 220 displays values in each cell as either text data or as a graphical indicator. The graphical indicator displayed by the display 220 is based on the indicator ID returned from the engine 210.

Figure 4:
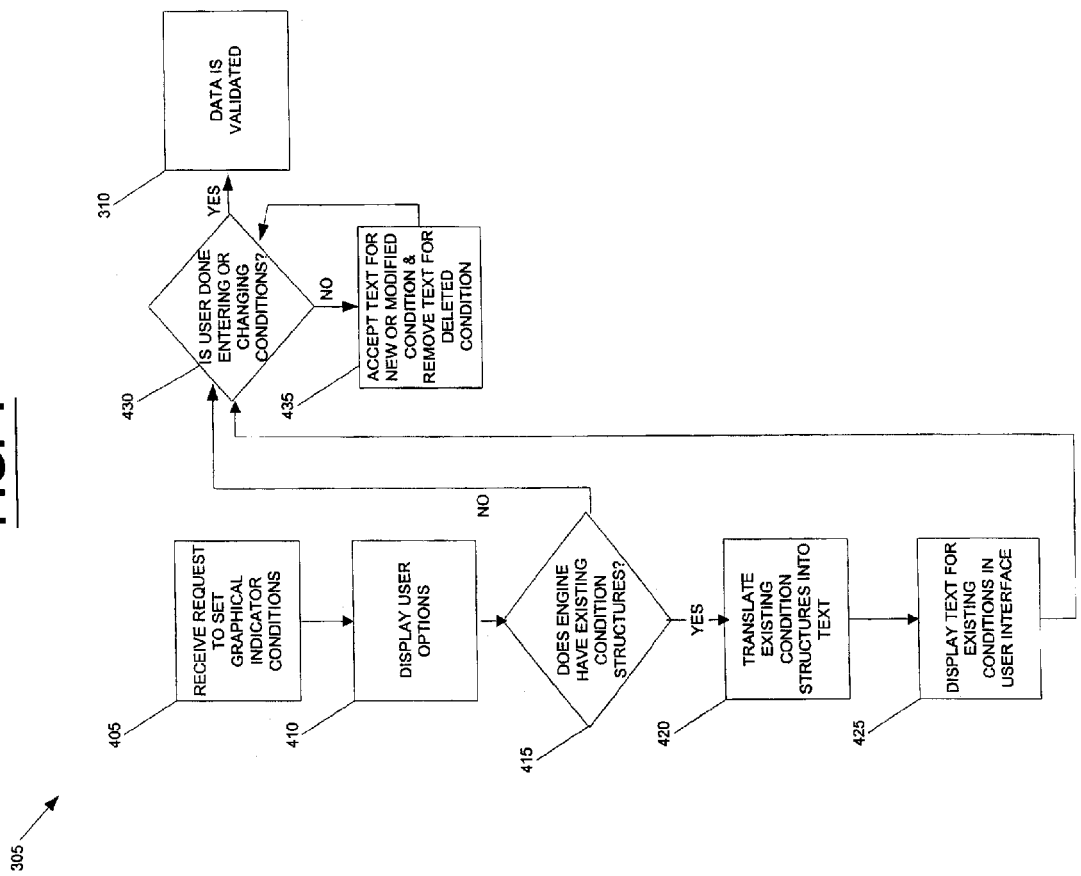
FIG. 4 is a flow diagram illustrating a method for obtaining graphical indicator conditions and graphical indicator choices in accordance with an exemplary embodiment of the present invention.

FIG. 4 is a flow diagram illustrating exemplary tasks completed by the UI 250 to accept graphical indicator conditions, as set forth in step 305 of FIG. 3. In step 405, a request to set graphical indictor conditions is received by the UI 250. In step 410, the possible user options are displayed. In step 415, the engine 210 is queried to find if it has existing condition structures for the field. If the answer to the inquiry in step 415 is yes, the existing condition structures are translated into text as set forth in step 420. Text is displayed for existing conditions by the UI 250 in step 425. At this point, the user is asked if he is done entering or changing conditions as set forth in step 430. If the answer to step 415 is no, the process skips to step 430 to determine whether the user is done entering or changing graphical indicator conditions. If the answer to step 430 is no, text for new or modified conditions is accepted and text for deleted conditions is removed in step 435. If the answer to step 430 is yes, the process moves to step 310 of FIG. 3.

Figure 5:
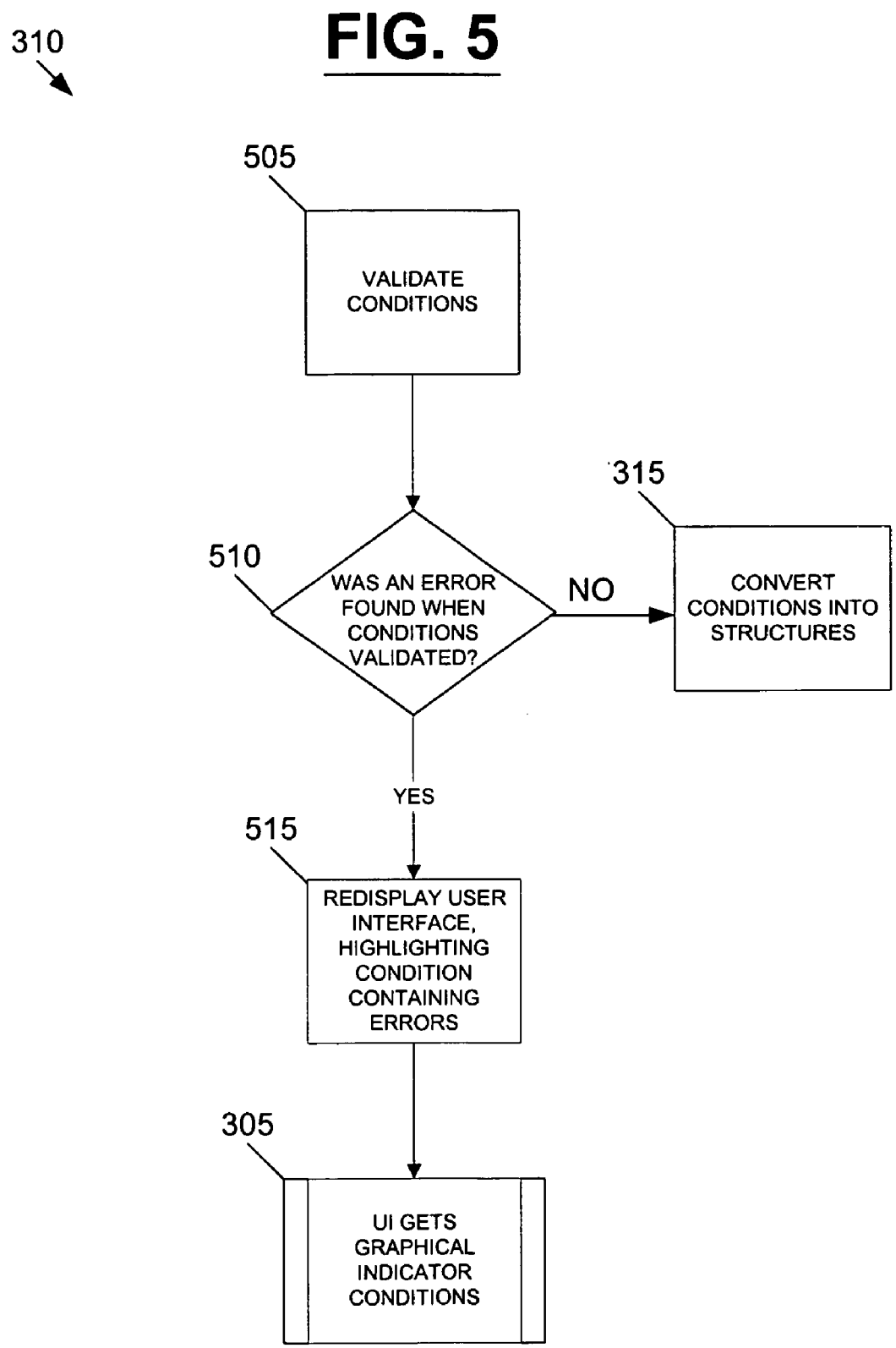
FIG. 5 is a flow diagram illustrating a method for validating data in accordance with an exemplary embodiment of the present invention.

FIG. 5 is a flow diagram illustrating exemplary tasks for validating data as set forth in step 310 of FIG. 3. The graphical indicator condition data entered by the user is validated in step 505. The condition data typically comprises test data for custom field values and corresponding image data. In step 510, an inquiry is conducted to determine whether an error was found in response to completing a validation of the condition data. If the answer to step 510 is yes, then the UI 250 is redisplayed, highlighting conditions containing errors as set forth in step 515. If the answer to step 510 is no, the user-entered condition data is translated into condition structures in step 315 of FIG. 3. The condition structures consist of separate records, each having a binary tree and an indicator ID. The binary tree represents the relationship between the custom field, the test data, and the value data. This tree is used by the engine 210 to find the appropriate graphical indicator image for the user-provided data.

The data is validated as set forth in steps 505–515 for the test data, the value data, and the image ID value data. First, the test data is validated. The test data is a string and must be equal to a predefined compare operation, such as "equals" or "is within". If the entered test data is not equal to one of the predefined compare operation strings, the UI 250 reports the problem and stops data validation.

Next, the value data is validated. The value data is a field name or data. If the value data is a field name, the field type must be the same as the custom field for which the criteria is being entered. If the value data is data, the data type must be the same as the data type of the custom field. If the value data does not meet these conditions, the UI 250 reports the problem and stops data validation.

Finally, the image data is validated. This image data must be a number and be equal to one of the predefined indicator image IDs. In the UI 250, the user picks from a list of images or the user enters a number that corresponds to an image. In an exemplary embodiment comprising 64 images, the images are numbered 1 to 64, and the blank image is numbered 0, so the ID number must be greater than or equal to 0 and less than or equal to 64. If the image data is outside of this range, the UI 250 does not accept the value.

Figure 6:
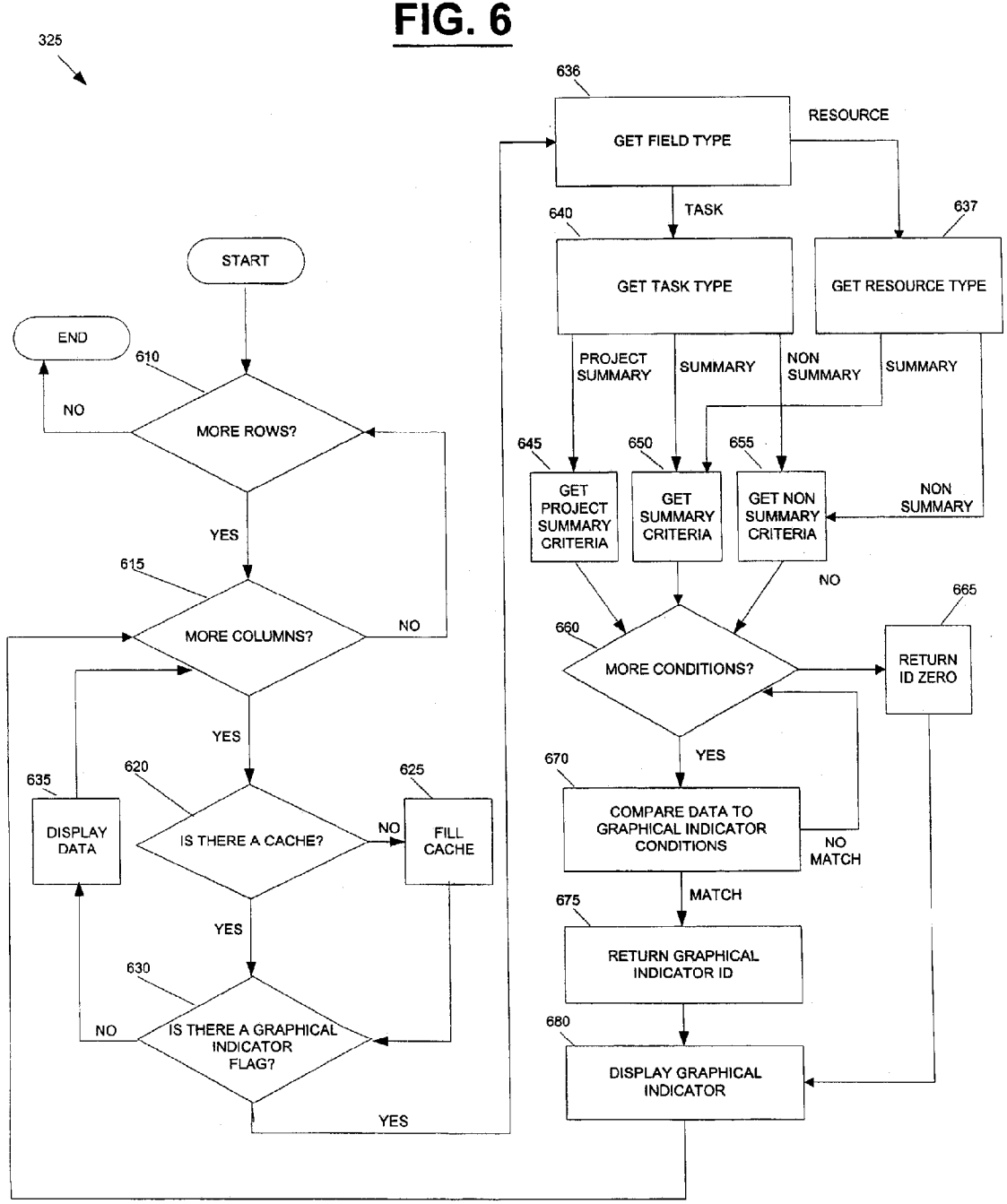
FIG. 6 is a flow diagram illustrating a method for displaying values in each cell as either text data or as a graphical indicator in accordance with an exemplary embodiment of the present invention.

FIG. 6 is a flow diagram illustrating exemplary tasks for displaying values in each cell as either text data or as a graphical indicator as set forth in step 325 of FIG. 3. In this process, the display 220 walks through the rows and columns in a grid, determines if any data elements have a graphical indicator flag, looks-up the graphical indicator ID, and displays the graphical indicator.

In step 610, the display 220 determines if there are any rows in the displayed data. If there are no rows, the process ends. If there are rows, the display 220 proceeds to step 615 to determine if there are more columns in the current row. If there are no more columns, the display 220 returns to step 610 and repeats the above process for the remaining rows until there are no more rows. If there are more columns, the display 220 determines whether a graphical indicator flag cache exists in step 620. This cache is used to temporarily save data about custom fields with graphical indicators. The cache is implemented as an array of bits, where each bit represents a visible field in the display sheet. If a field has graphical indicators associated with it, the appropriate bit in the cache is set to 1, otherwise the bit is set to 0.

If a cache does not already exist, a cache is created and filled in step 625. Once the cache is created and filled, or if the cache already exists, the display 220 determines whether a graphical indicator flag is set for the current value in step 630. To determine if the field has graphical indicators, the display 220 asks the cache if the appropriate bit is set to 0 or 1 and, if it is set to 1, operations are performed to display the graphical indicator instead of the data in the display sheet. If the bit in the cache is set to 0, the display 220 proceeds to step 635 and displays the data as a text/numeric value. The process then continues to step 615 to process any remaining columns.

If the bit in the cache is set to 1 in step 630, an inquiry is conducted in step 636 to determine if the current record is a task or resource field. If the record is a task, then the display 220 proceeds to step 640 and gets the task type. If the record is a resource, then the display 220 proceeds to step 637 and gets the resource type. For the project management example, there are three possible task record types per field: a project summary task, a summary task, or a nonsummary task. There are two possible resource types: a summary resource or a nonsummary resource. If the task type is a project summary, then the project summary graphical indicator conditions are obtained in step 645. If the task or resource type is a summary, then the summary graphical indicator conditions are obtained in step 650. If the task or resource type is a nonsummary, then the nonsummary graphical indicator conditions are obtained in step 655. These conditions can be the conditions that the user set-up to correspond to determined graphical indicators.

In step 660, if there are no conditions, the engine 210 returns an ID of 0 in step 665, which means that there is not a graphical indicator for the data. In this case, the process will skip to step 680 and a blank cell will be displayed. If there is another condition, the engine 210 compares the value from the display 220 against the graphical indicator condition in step 670. If there is a match, the engine 210 can go to step 675. If there is no match, the engine 210 asks if there are more conditions and repeats the comparison step until the engine 210 gets a match or until there are no more conditions, as set forth in step 660.

In step 675, the engine 210 returns the graphical indicator ID associated with the graphical indicator condition based on the match. In step 680, the display 220 looks up the graphical indicator that matches the ID and paints the graphical indicator. If the ID is 0, an empty cell, or blank indicator is painted.

The process above is continued for the remaining rows, and the remaining columns in those rows.

The Screen Displays

In an exemplary embodiment of the present invention, the user can input graphical indicator conditions for project management tasks. For a representative project management example, the conditions will test if spending on project tasks is within-budget or over-budget, and will provide graphical indicators that indicate the task status. For example, the spending is within-budget if the actual cost is <or =$500.00. For within-budget spending, the user will choose to display a smiley face indicator instead of the actual cost amount. The spending is over-budget if the actual cost is >$500.00. For over-budget spending, the user will choose to display a frowny face indicator instead of the actual cost amount.

To illustrate the operation of this exemplary embodiment, we will assume that the user has a project management file that contains a list of tasks with actual cost data entered into various fields. This information will be in a grid format where each field represents one column of one row. We also assume that the project is underway and various tasks have been completed and the actual cost results have been entered.

Figure 7:
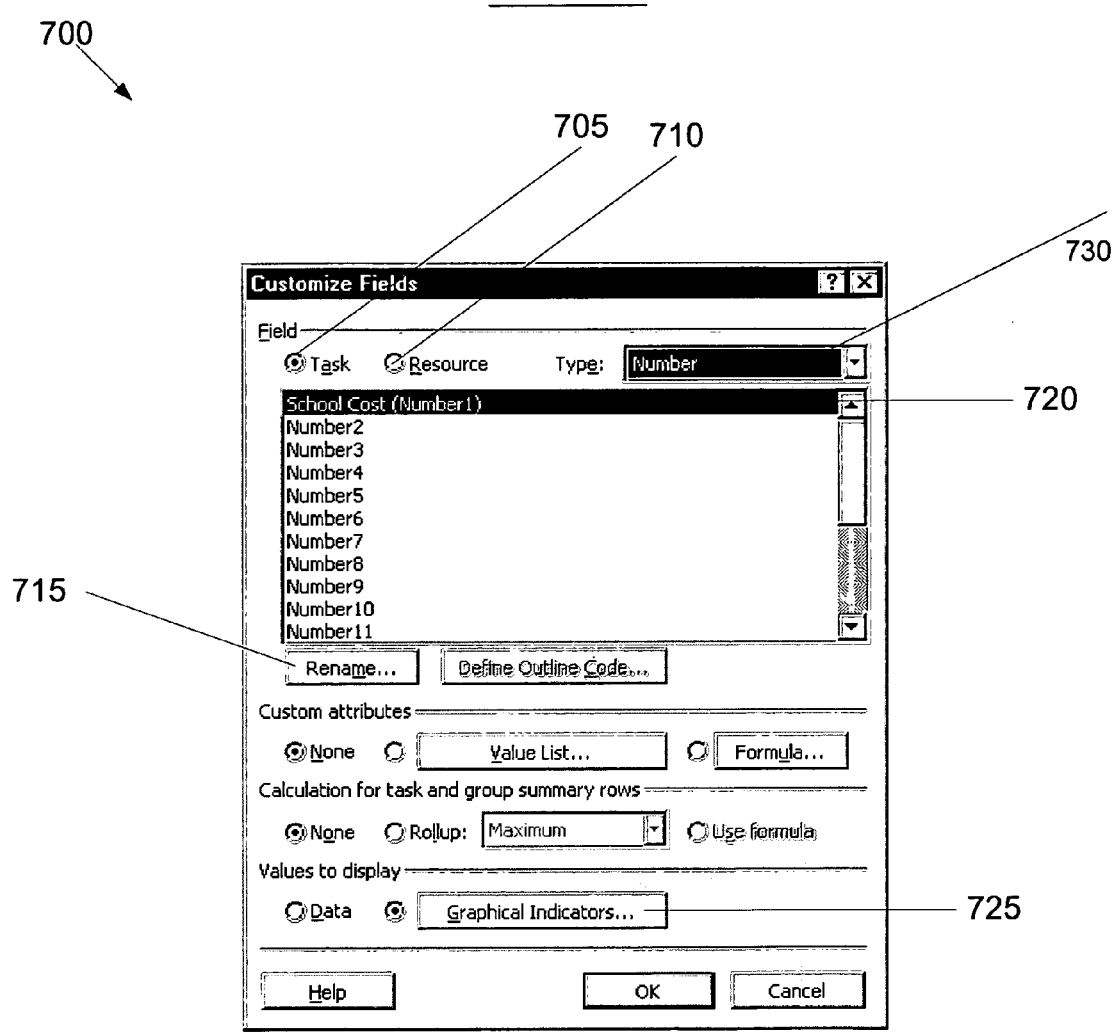
FIG. 7 is a screen display illustrating a Customize Fields dialog box in accordance with an exemplary embodiment of the present invention.

FIG. 7 is a screen display illustrating an exemplary "Customize Fields" dialog box 700 for the above project management example. This dialog box 700 displays the project management field information needed to use the graphical indicators. This dialog box 700 allows the user to define the way that data is displayed in a field or to identify a location in a record in which a particular type of data is stored. For example, the dialog box 700 provides custom fields where the user can specify custom properties for those fields. The dialog box 700 comprises a task option 705, a resource option 710, a field type 730, and a graphical indicators option 725.

Referring to FIG. 7, a user can choose from two types of fields: task 705 and resource 710. A task 705 is an individual unit of work that is part of the total work needed to accomplish a project. A resource 710 is personnel, equipment, materials, or a service needed to complete a task in a project. The different field types 730 for the task and resource fields include cost, date, duration, finish, flag, number, outline, code, start, and text. In an exemplary embodiment, a user can choose Number1 720 as one of the task fields. The rename option 715 is used to rename the Number1 task field "School Cost" for the representative example above. One of the options under the customize fields dialogue box is the graphical indicators option 725. The user chooses this option 725 to allow the use of graphical indicators in the "School Cost" custom field in the representative example.

Figure 8:
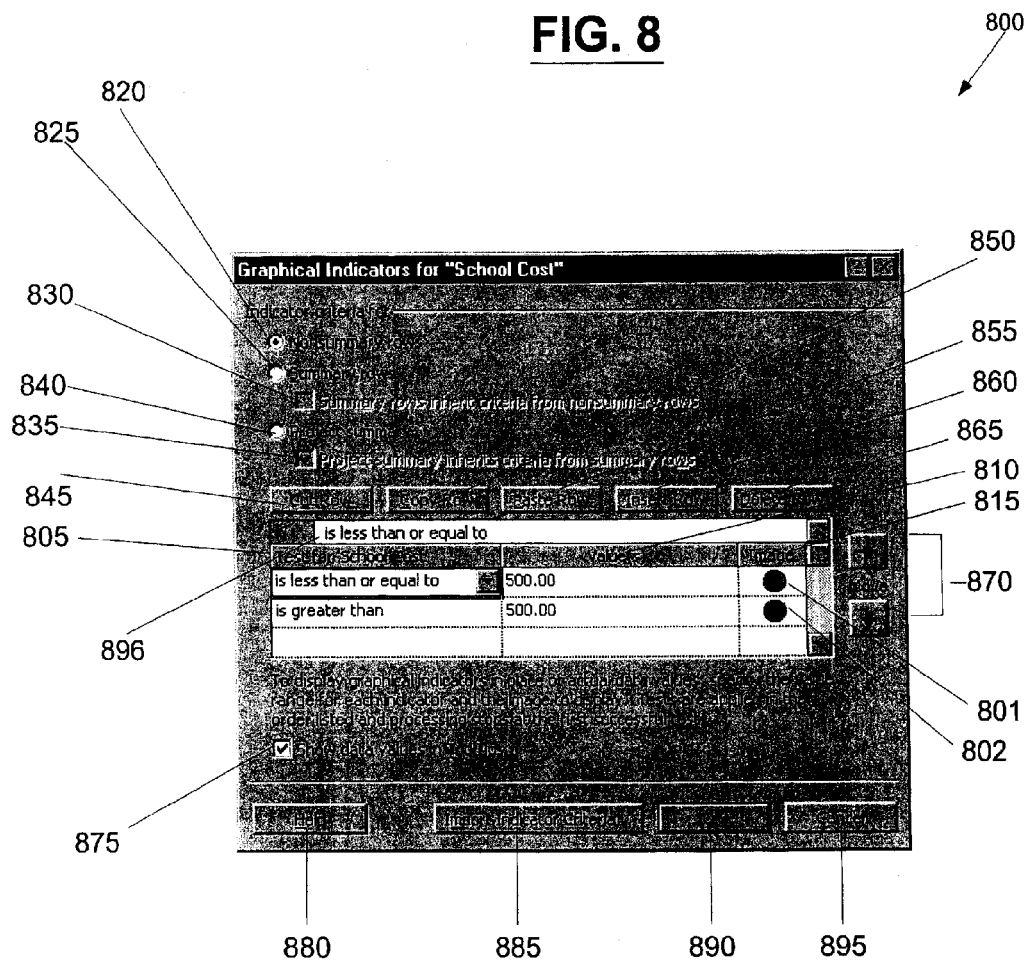
FIGS. 8–9 are screen displays illustrating Graphical Indicators dialog boxes in accordance with an exemplary embodiment of the present invention.

FIG. 8 is a screen display showing the summary user-entered conditions for the above project management example. This "Graphical Indicators" dialog box 800 can be used to specify conditions for displaying graphical indicators in place of actual data values. In the representative example, the user can choose the graphical indicators option 725 after he selects the task field of "School Cost" 720 as set forth in FIG. 7. The user then sees the dialog box 800 and can enter indicator criteria for nonsummary rows for the representative example. The user can specify the test 805, values 810, and images 815 to be used. For data that meets the test conditions, the corresponding graphical indicator can be displayed.

The indicator criteria choices allow the user to enter the conditions for displaying the graphical indicators in different levels. In an exemplary embodiment, there are three criteria levels for project management information: nonsummary 820, summary 825, and project summary 840.

The first indicator criteria comprises the nonsummary rows 820. This option allows the user to enter conditions for displaying graphical indicators for nonsummary tasks or resources.

The second indicator criteria comprises the summary rows 825. This option allows the user to enter conditions for displaying graphical indicators for summary rows. This can include both summary tasks and temporary grouping summaries for task custom fields or just temporary grouping summaries for resource custom fields.

The checkbox for "Summary rows inherit criteria from nonsummary rows" 830 determines whether the same set of indicators and test criteria that apply to the nonsummary task or resources will be applied to the summary rows and group headers. This component allows the user to copy criteria from somewhere else instead of re-entering the criteria. This checkbox 830 can be checked by default, so any nonsummary criteria can be automatically copied. If the checkbox 830 is checked, the grid and buttons are disabled.

If the checkbox is cleared, the grid and buttons can be enabled. Once the grid and buttons are enabled, any existing criteria can remain, but can be freely edited or deleted. Turning the inheritance option on again can re-copy any data from the nonsummary rows grid and overwrite the current lists, consequently an alert can be displayed when the user actually checks the checkbox and the grid is not empty. By pressing the "yes" button when the alert appears, the non-summary criteria can be copied.

The third indicator criteria comprises the project summary 840. This option allows the user to enter conditions for displaying graphical indicators for project summary rows. The project summary edit options can be disabled when the "Project summary inherits criteria from the summary rows" checkbox 835 is cleared. This checkbox 835 can determine if the same set of indicators and test criteria that apply to the summary tasks will be applied to the project summary tasks. This checkbox 835 can be checked by default, so any summary criteria can be automatically copied. If the checkbox 835 is cleared, the grid and buttons can be enabled as described above for summary rows. If the checkbox 835 is re-checked and the grid is not empty, the same inheritance alert as discussed above can be displayed.

The "Cut Row" 845, "Copy Row" 850, "Paste Row" 855, "Insert Row" 860, and "Delete Row" 865 can be applied to edit the graphical indicator criteria. These options can be disabled. The move indicator 870 represents a "move" function for moving the row with the current selection up or down within the grid. The condition tests are applied in the order they are listed and the graphical indicator for the first successful test is the one used. The move 870 can be disabled whenever the grid is disabled. By choosing the "Show data values in ToolTips" checkbox 875 when the user hovers the mouse over a custom field cell with a graphical indicator, a ToolTip is displayed containing an actual data value. This option can be turned on by default.

The "Import Indicator Criteria" 885 can copy the indicator criteria from another custom field in the same or another project. This option will cause a separate screen to be displayed showing the "Import Indicator Criteria" dialog box. This dialog box allows a user to copy the indicator criteria lists from another custom field or another project. The user can enter the project file name, and either a task or resource field type. The user can also enter the field. Only the criteria for enabled grids can be copied. For example, if criteria is imported while both the "Summary rows inherit criteria from nonsummary rows" checkbox 830 and "Project summary inherits criteria from summary rows" checkbox 835 are unchecked, only nonsummary criteria can be imported, because that is the only enabled grid. If the data type of the imported criteria is incorrect for the current field, the type mismatch will be flagged.

The entry bar 896 can display the ID number of the highlighted graphical indicator. Pressing "OK" 890 commits any changes or additions and proceeds to step 310 for validation of the data. Pressing "Cancel" 895 can return the user to the screen of FIG. 7. Pressing "Help" 880 can provide the user with help information.

As mentioned above, the graphical indicator criteria comprises data defined by three data columns: test, value, and image. The test column 805 can indicate the test being applied. Clicking a cell in this column can switch the cell to an in-place drop-down menu with choices such as: equal, does not equal, is greater than, is greater than or equal to, is less than, is less than or equal to, is within, is not within, contains, does not contain, contains exactly, is any value, etc. If conflicting test conditions or data ranges are specified, the order in which the tests are listed in the grid can determine which one takes precedence (and the move buttons can be used to rearrange that order). The list is read and applied in top-to-bottom order and processing is halted as soon as a test evaluates to true. If there are overlapping or conflicting tests conditions further down the list, they have no impact on the previous conditions that have already been applied.

In the value column 810, the user enters the values that the field contents are to be tested against. The user can also click a field from the list to compare its contents with the contents of the custom field. Values must match the type of field they are being tested against. For example, if the user is specifying conditions for a cost custom field, the user cannot use Finish Date in the value field.

An alert is displayed if the value specified is the wrong data type for the current custom field or if an invalid field name is referenced (e.g.[actual Kost]). Pressing "OK" in the alert returns the user to the cell in the values column that contains the problem.

Clicking on a cell in the image column 815 can switch the cell to an in-place dropdown that contains the available graphical indicators. The graphical indicators can include bubbles, boxes, flags, check marks, dashes, plus signs, diamonds, arrows, and other symbols. The graphical indicators can be displayed based on the column alignment (left, center, or right) specified in the align data option in the sheet for that column.

When graphical indictors are turned on for a custom field, it can be in a separate mode, so only graphical indictors and not data can be shown (except when editing an item). If there are values in the field that do not require a graphical indicator, a blank cell can be shown. The ToolTips, if enabled, can show the data for a blank cell.

FIG. 8 displays the nonsummary user-entered conditions for the above project management example. The user can enter indicator criteria for nonsummary rows 820. For the first row 801, the user enters the test of "is less than or equal to", the value of "500.00" and the image of a smiley face. For the second row 802, the user enters the test of "is greater than", the value of "500.00", and the image of a frowny face.

Figure 9:
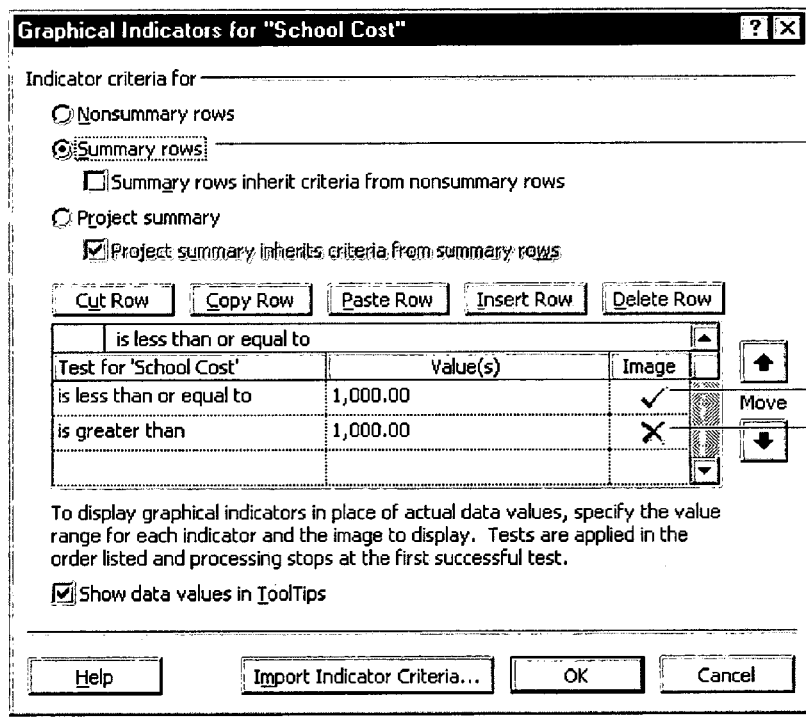

FIG. 9 is a representative screen display showing the summary user-entered conditions for the above project management example. On this screen, the user has entered indicator criteria for summary rows 905. In this example, for the first row 910, the user enters the test of "is less than or equal to", the value of "1,000.00", and the image of a check mark. For the second row 915, the user enters the test of "is greater than", the value of "1,000.00", and the image of an X mark.

At this point, the data is validated as set forth in step 310 of FIG. 3. This is done by validating the conditions set by the user. If an error is found in this validation, the UI 250 is redisplayed, highlighting the graphical indicator conditions that contain an error, and thus cannot be converted into structures. If there are no errors, or once the errors are fixed, the text is then converted into structures as set forth in step 315 of FIG. 3. At this point, the engine 210 stores the structures and the associated graphical indicator IDs as set forth in step 320 of FIG. 3. The display 220 will get a request to show the project data. The display 220 will loop through the user's project data, which is normally displayed in a spreadsheet like grid of rows and columns, and will determine whether to write textual data or draw a graphical indicator in each cell as set forth in step 325 of FIG. 3.

Figure 10:
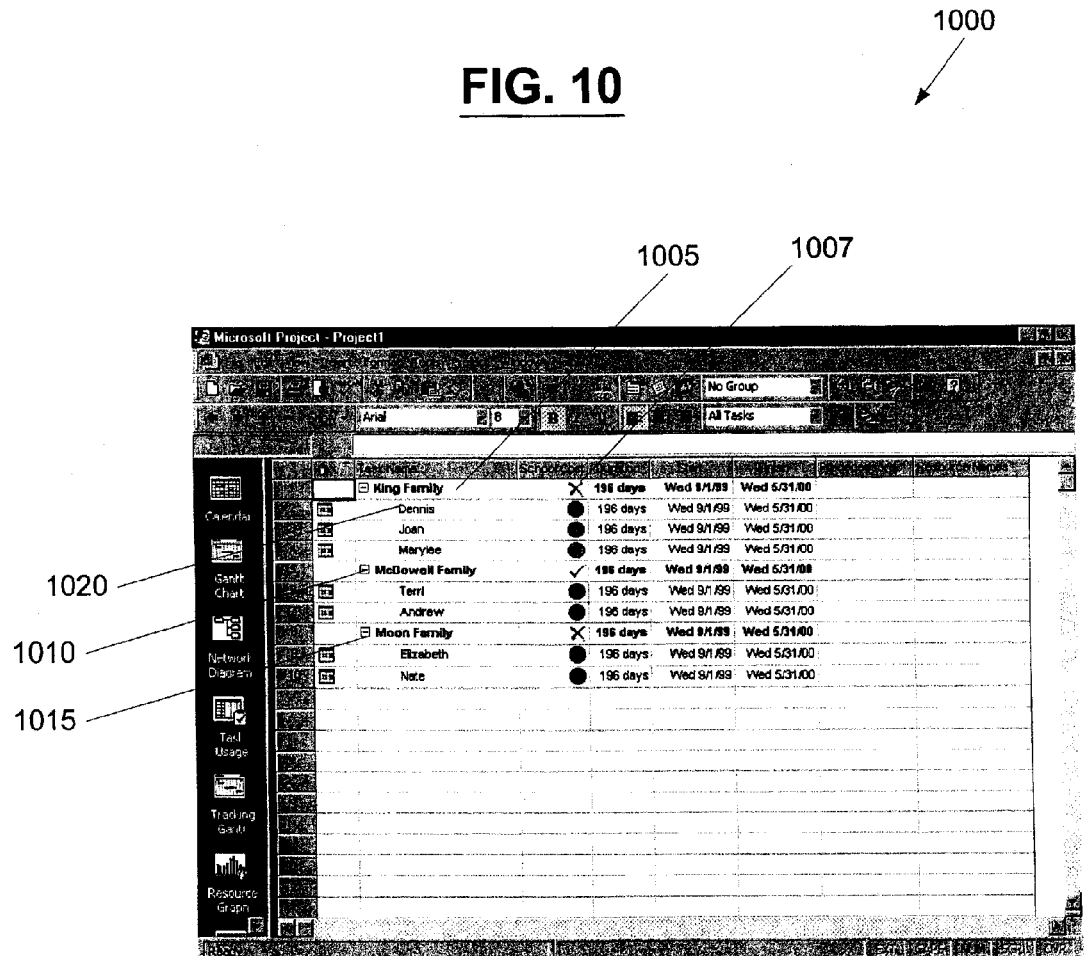
FIG. 10 is a screen display showing a project management grid in accordance with an exemplary embodiment of the present invention.

FIG. 10 is a screen display showing an exemplary embodiment of the present invention, using project management data present in a grid format. There is a graphical indicator for each custom field. Cell 1005 is a default field (the Task Name field), thus there is no graphical indicator flag, so the data "King Family" would be displayed. When the display 220 moves to cell 1007 in the "School Cost" column (a custom field) for the data "$2,000.00", it asks if there is a flag, as set forth in step 630 of FIG. 6, and gets a "yes." Because of the flag, the display 220 sends the engine 210 the task type (summary) and the actual cost value ($2,000.00), as set forth in steps 640, 650, and 660 of FIG. 6. Because the task type is a summary type, the display 220 will get the summary conditions that the user set up as set forth in FIG. 9.

The engine 210 now gets the first graphical indicator condition for the summary tasks which is "School Cost is less than or equal to $1000.00" 910 as set forth in FIG. 9. The engine 210 starts at the top of the list of conditions, compares the data, and continues until it finds a match as set forth in step 670 of FIG. 6. In this example, the engine 210 will find that the "$2,000.00" for "School Cost" does not fit within the criteria for a check mark (is less than or equal to $1,000.00). Because there is no match, the engine 210 goes to the next summary condition "is greater than $1,000.00" 915. Because there is a match, the engine 210 takes the associated indicator ID for a X mark (for example "3") and returns it to the display 220, as set forth in step 675 of FIG. 6. If there is no match when the comparison is executed by the engine 210, the display 220 goes back and asks if there are more conditions and repeats the comparison step until the engine 210 gets a match as set forth in step 660 and 670 of FIG. 6.

The display 220 looks up the graphical indicator that matches the ID "3", sees that it needs to paint an X mark, and paints the X mark as set forth in step 680 of FIG. 6.

This same test is applied for the 5th row cells 1010 named "McDowell Family" and the 8th row cells 1015 named "Moon Family." Because the data entered for the "School Cost" for the "McDowell Family" is "800.00", a check mark is displayed. Similarly, because the data entered for the "School Cost" of the "Moon Family" is "1500.00", an X mark is displayed.

The same type of analysis applies to the nonsummary rows. Rows 2–4, 6–7, and 9–10 are all nonsummary rows, and are thus indented on the chart. The graphical indicator conditions that the data in these rows are subject to follow the conditions set up in FIG. 8. In the $2^{nd}$ row cells 1020, the "School Cost" for "Dennis" is "600.00". Thus, following the criteria the user entered for the nonsummary rows, a frowny face is displayed. Rows 3–4, 6–7, and 9–10 similarly display either a smiley face or a frowny face depending on whether the data value is less than or equal to or greater than $500.00.

The user can use the hover option to hover the mouse pointer over the images of the check marks, X marks, smiley faces, and frowny faces. When the mouse pointer is hovered over the images, the underlying numeric data will be displayed.

The user also has the option to enter conditions and graphical indicators that are much more complicated than the above conditions. In addition to the numerous graphical indicators available in the current embodiment, the user has the option to enter clip art or other customized images.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. A method in a computer implemented project information management system, the method comprising:
 providing a project having summary tasks and non-summary tasks, each summary task and non-summary task having a cost field with project cost information and each summary task including a plurality of non-summary tasks;

for each summary task and non-summary task, receiving from a user a display option indicating whether to display text data or graphical indicators for the cost field;
  receiving from the user a summary under budget threshold, a summary under budget graphical indicator, a summary over budget threshold, and a summary over budget graphical indicator for summary data contained in the cost field; and
  receiving from the user a non-summary under budget threshold, a non-summary under budget graphical indicator, a non-summary over budget threshold, and a non-summary over budget graphical indicator for non-summary data contained in the cost field, wherein the received thresholds and indicators can be different for each summary task and non-summary task;
validating and storing the received thresholds, indicators, and display option;
processing the cost field for each summary task and non-summary task;
when processing the cost field for each summary task and non-summary task,
  determining whether the display option indicates displaying graphical indicators or text data for the field;
  if the display option indicates to display text data, displaying text data for the cost field;
  if the display option indicates to display graphical indicators and the cost field contains summary data,
    retrieving the stored summary under budget and summary over budget thresholds;
    comparing the project cost information contained in the cost field with the summary under budget threshold;
    if the project cost information is less than the under budget threshold, displaying the summary under budget graphical indicator;
    comparing the project cost information contained in the cost field with the summary over budget;
    if the project cost information threshold is greater than the summary over budget threshold, displaying the summary over budget indicator;
  if the display option indicates to display graphical indicators and the cost field contains non-summary data,
    retrieving the stored non-summary under budget and summary over budget thresholds;
    comparing the project cost information contained in the cost field with the non-summary under budget threshold;
    if the project cost information is less than the non-summary under budget threshold, displaying the non-summary under budget graphical indicator;
    comparing the project cost information contained in the cost field with the non-summary over budget threshold; and
    if the project cost information is greater than the non-summary over budget threshold, displaying the non-summary over budget indicator.

2. A method in a computer-implemented project information management system, the method comprising:
  receiving a project having a plurality of tasks, each task having a cost field;
  receiving from a user a display option indicating whether to display text data or graphical indicators for the cost field of a task;
  receiving from a user an under budget threshold, a under budget graphical indicator, an over budget threshold, and an over budget graphical indicator for data contained in the cost field of the task, wherein the received thresholds and indicators can be different for each task;
  processing the cost field for a task; and
  when processing the cost field for a task,
    determining whether the display option indicates displaying graphical indicators or text data for the cost field of the task;
    when the display option indicates to display text data, displaying text data for the cost field; and
    when the display option indicates to display graphical indicators,
      when the cost field is less than the under budget threshold, displaying the under budget graphical indicator; and
      when the cost field is greater than the over budget threshold, displaying the over budget graphical indicator.

3. The method of claim 2 wherein the determining and displaying are performed in a prioritized order.

4. The method of claim 2 including when it is determined that the project cost information does not satisfy any of the thresholds, displaying the data value.

5. The method of claim 2 wherein at least one of the graphical indicators is pre-defined.

6. The method of claim 2 wherein the project cost information corresponds to an attribute of the project.

7. The method of claim 2 wherein the thresholds and the graphical indicators are received via a user interface that provides pre-defined tests for use in a condition.

8. The method of claim 2 wherein the thresholds and the graphical indicators are received via a user interface through which the user can specify whether the thresholds applies to summary or nonsummary data.

9. The method of claim 8 wherein the summary data includes a project summary data.

10. The method of claim 8 wherein when a threshold applies to nonsummary data, receiving an indication as to whether the summary data inherits the same threshold.

11. A computer-readable medium having computer-executable instructions for performing steps according to claim 2.

12. A project information management system, the system comprising:
  a user interface that receives a project having a plurality of tasks, each task having a cost field;
  memory storage that for each task, stores a display option indicating whether to display text data or graphical indicators for the cost field, and that for each task with a display option indicating to display graphical indicators, stores an under budget threshold, an under budget graphical indicator, an over budget threshold, and an over budget graphical indicator for the cost field of the task, wherein the received thresholds and indicators can be different for each task;
  a graphical indicator engine that processes the cost field of a task, when processing the cost field for a task,
    determines whether the display option indicates displaying graphical indicators or text data for the cost field;
    when the display option indicates to display text data, displays text data for the cost field; and
    when the display option indicates to display graphical indicators, retrieves the stored under budget and over budget thresholds;

compares project cost information contained in the cost field with the under budget threshold;

when the project cost information is less than the under budget threshold, displays the under budget graphical indicator;

compares the project cost information contained in the cost field with the over budget threshold; and when the project cost information is greater than the over budget threshold, displays the over budget graphical indicator.

13. The project information management system of claim 12 wherein the determining and displaying are performed in a prioritized order.

14. The project information management system of claim 12 wherein when processing the cost field for a task, if the component determines that the project cost information does not satisfy any of the thresholds, the component displays the data value.

15. The project information management system of claim 12 wherein at least one of the graphical indicators is pre-defined.

16. The project information management system of claim 12 wherein the project cost information corresponds to an attribute of the project.

17. The project information management system of claim 12 further comprising a component that receives the thresholds and the graphical indicators via a user interface that provides pre-defined tests for use in a condition.

18. The project information management system of claim 12 further comprising a component that receives the thresholds and the graphical indicators via a user interface through which the user can specify whether the thresholds applies to summary or nonsummary data.

19. The project information management system of claim 18 wherein the summary data includes a project summary data.

20. The project information management system of claim 18 wherein when a threshold applies to nonsummary data, the component receives an indication as to whether the summary data inherits the same threshold.

* * * * *